United States Patent [19]
Nielsen et al.

[11] Patent Number: 6,104,417
[45] Date of Patent: *Aug. 15, 2000

[54] UNIFIED MEMORY COMPUTER ARCHITECTURE WITH DYNAMIC GRAPHICS MEMORY ALLOCATION

[75] Inventors: Michael J. K. Nielsen, San Jose; Zahid S. Hussain, Palo Alto, both of Calif.

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/713,779

[22] Filed: Sep. 13, 1996

[51] Int. Cl.$^7$ ....................................... G06F 13/16
[52] U.S. Cl. .................. 345/521; 345/519; 345/502; 345/512; 711/202
[58] Field of Search ................................ 345/501, 502, 345/521, 512, 519; 711/202, 203, 205

[56] References Cited

U.S. PATENT DOCUMENTS 5,450,542  9/1995  Lehman et al. ........................ 345/512
5,640,543  6/1997  Farrell et al. ........................... 345/502

*Primary Examiner*—Kee M. Tung
*Attorney, Agent, or Firm*—Wagner, Murabito & Hao

[57] ABSTRACT

A computer system provides dynamic memory allocation for graphics. The computer system includes a memory controller, a unified system memory, and memory clients each having access to the system memory via the memory controller. Memory clients can include a graphics rendering engine, a CPU, an image processor, a data compression/expansion device, an input/output device, a graphics back end device. The computer system provides read/write access to the unified system memory, through the memory controller, for each of the memory clients. Translation hardware is included for mapping virtual addresses of pixel buffers to physical memory locations in the unified system memory. Pixel buffers are dynamically allocated as tiles of physically contiguous memory. Translation hardware is implemented in each of the computational devices, which are included as memory clients in the computer system, including primarily the rendering engine.

29 Claims, 13 Drawing Sheets

UNIFIED MEMORY COMPUTER ARCHITECTURE WITH DYNAMIC GRAPHICS MEMORY ALLOCATION

BACKGROUND OF THE INVENTION

The present invention relates to the field of computer systems. Specifically, the present invention relates to a computer system architecture including dynamic memory allocation of pixel buffers for graphics and image processing.

BACKGROUND OF THE INVENTION

Typical prior art computer systems often rely on peripheral processors and dedicated peripheral memory units to perform various computational operations. For example, peripheral graphics display processors are used to render graphics images (synthesis) and peripheral image processors are used to perform image processing (analysis). In typical prior art computer systems, CPU main memory is separate from peripheral memory units which can be dedicated to graphics rendering or image processing or other computational functions.

With reference to Prior Art FIG. 1, a prior art computer graphics system 100 is shown. The prior art computer graphics system 100 includes three separate memory units; a main memory 102, a dedicated graphics memory 104, and a dedicated image processing memory (image processor memory) 105. Main memory 102 provides fast access to data for a CPU 106 and an input/output device 108. The CPU 106 and input/output device 108 are connected to main memory 102 via a main memory controller 110. Dedicated graphics memory 104 provides fast access to graphics data for a graphics processor 112 via a graphics memory controller 114. Dedicated image processor memory 105 provides fast access to buffers of data used by an image processor 116 via an image processor memory controller 118. In the prior art computer graphics system 100, CPU 106 has read/write access to main memory 102 but not to dedicated graphics memory 104 or dedicated image processor memory 105. Likewise, the image processor 116 has read/write access to dedicated image processor memory 105, but not to main memory 102 or dedicated graphics memory 104. Similarly, graphics processor 112 has read/write access to dedicated graphics memory 104 but not to main memory 102 or dedicated image processor memory 105.

Certain computer system applications require that data, stored in main memory 102 or in one of the dedicated memory units 104, 105, be operated upon by a processor other than the processor which has access to the memory unit in which the desired data is stored. Whenever data stored in one particular memory unit is to be processed by a designated processor other than the processor which has access to that particular memory unit, the data must be transferred to a memory unit for which the designated processor has access. For example, certain image processing applications require that data, stored in main memory 102 or dedicated graphics memory 104, be processed by the image processor 116. Image processing is defined as any function(s) that apply to two dimensional blocks of pixels. These pixels may be in the format of file system images, fields, or frames of video entering the prior art computer system 100 through video ports, mass storage devices such as CD-ROMs, fixed-disk subsystems and Local or Wide Area network ports. In order to enable image processor 116 to access data stored in main memory 102 or in dedicated graphics memory 104, the data must be transferred or copied to dedicated image processor memory 105.

One problem with the prior art computer graphics system 100 is the cost of high performance peripheral dedicated memory systems such as the dedicated graphics memory unit 104 and dedicated image processor memory 105. Another problem with the prior art computer graphics system 100 is the cost of high performance interconnects for multiple memory systems. Another problem with the prior art computer graphics system 100 is that the above discussed transfers of data between memory units require time and processing resources.

Thus, what is needed is a computer system architecture with a single unified memory system which can be shared by multiple processors in the computer system without transferring data between multiple dedicated memory units.

SUMMARY OF THE INVENTION

The present invention pertains to a computer system providing dynamic memory allocation for graphics. The computer system includes a memory controller, a unified system memory, and memory clients each having access to the system memory via the memory controller. Memory clients can include a graphics rendering engine, a central processing unit (CPU), an image processor, a data compression/expansion device, an input/output device, and a graphics back end device. In a preferred embodiment, the rendering engine and the memory controller are implemented on a first integrated circuit (first IC) and the image processor and the data compression/expansion are implemented on a second IC. The computer system provides read/write access to the unified system memory, through the memory controller, for each of the memory clients. Translation hardware is included for mapping virtual addresses of pixel buffers to physical memory locations in the unified system memory. Pixel buffers are dynamically allocated as tiles of physically contiguous memory. Translation hardware, for mapping the virtual addresses of pixel buffers to physical memory locations in the unified system memory, is implemented in each of the computational devices which are included as memory clients in the computer system.

In a preferred embodiment, the unified system memory is implemented using synchronous DRAM. Also in the preferred embodiment, tiles are comprised of 64 kilobytes of physically contiguous memory arranged as 128 rows of 128 pixels wherein each pixel is a 4 byte pixel. However, the present invention is also well suited to using tiles of other sizes. Also in the preferred embodiment, the dynamically allocated pixel buffers are comprised of $n^2$ tiles where n is an integer.

The computer system of the present invention provides functional advantages for graphical display and image processing. There are no dedicated memory units in the computer system of the present invention aside from the unified system memory. Therefore, it is not necessary to transfer data from one dedicated memory unit to another when a peripheral processor is called upon to process data generated by the CPU or by another peripheral device.

BRIEF DESCRIPTION OF THE DRAWINGS

The present invention is illustrated by way of example, and not by way of limitation, in the figures of the accompanying drawings and in which like reference numerals refer to similar elements and in which.

Prior Art

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Reference will now be made in detail to the preferred embodiments of the present invention, a computer system architecture having dynamic memory allocation for graphics, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
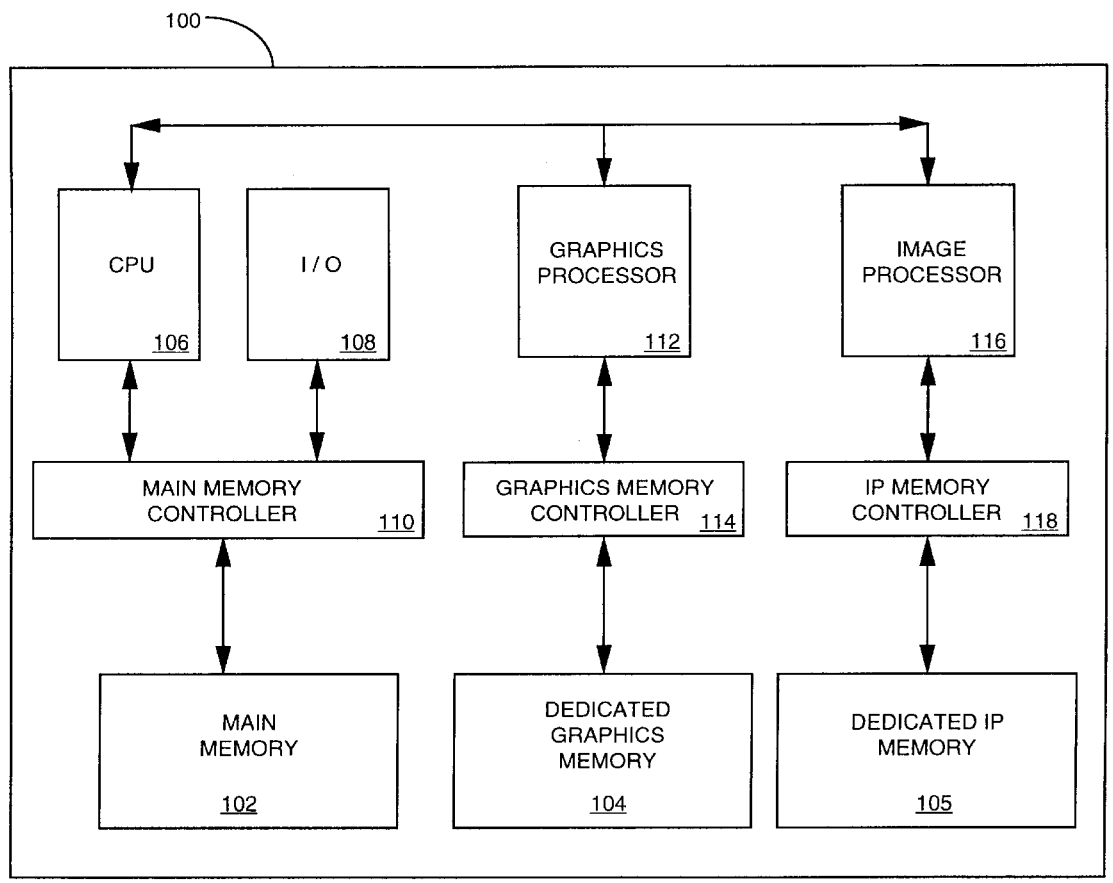
FIG. 1 is a circuit block diagram of a typical prior art computer system including peripheral processors and associated dedicated memory units.
Figure 2A:
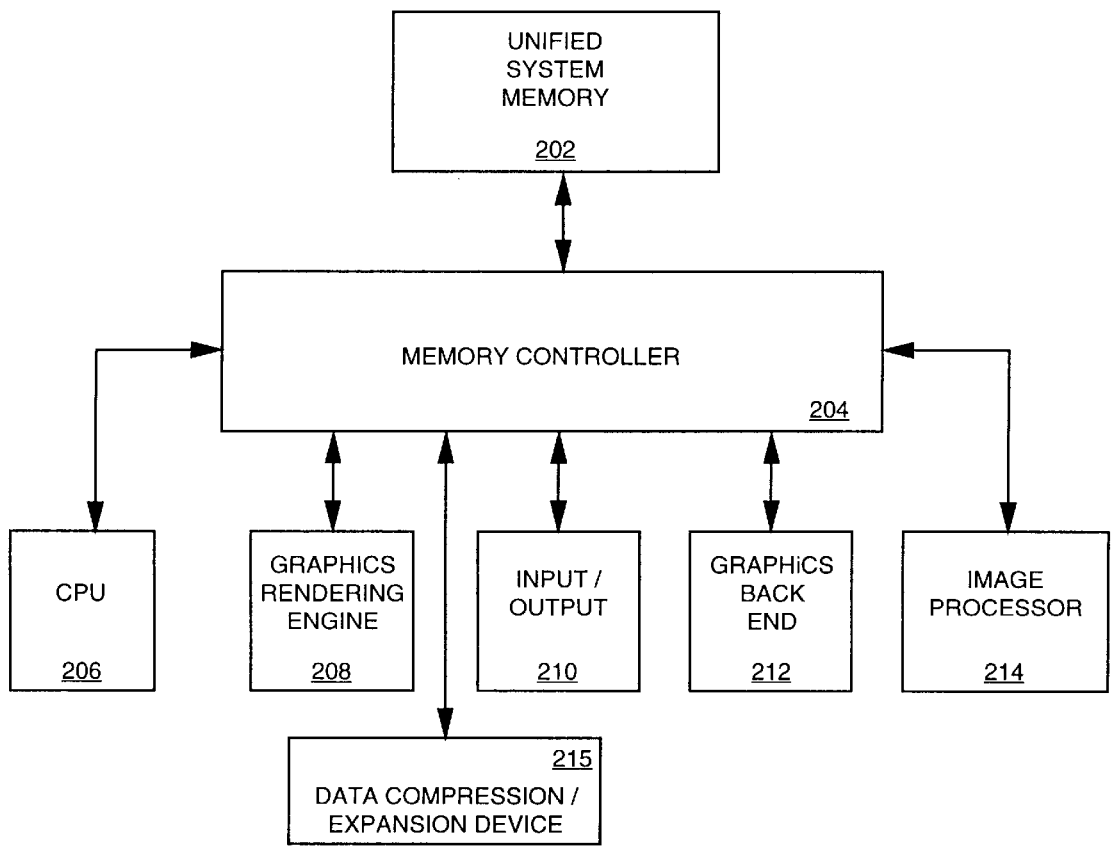
FIG. 2A is a circuit block diagram of an exemplary unified system memory computer architecture according to the present invention.

With reference to FIG. 2A, a computer system 200, according to the present invention, is shown. Computer system 200 includes a unified system memory 204 which is shared by various memory system clients including a CPU 206, a graphics rendering engine 208, an input/output IC 210, a graphics back end IC 212, an image processor 214, data compression/expansion device 215 and a memory controller 204.

Figure 2B:
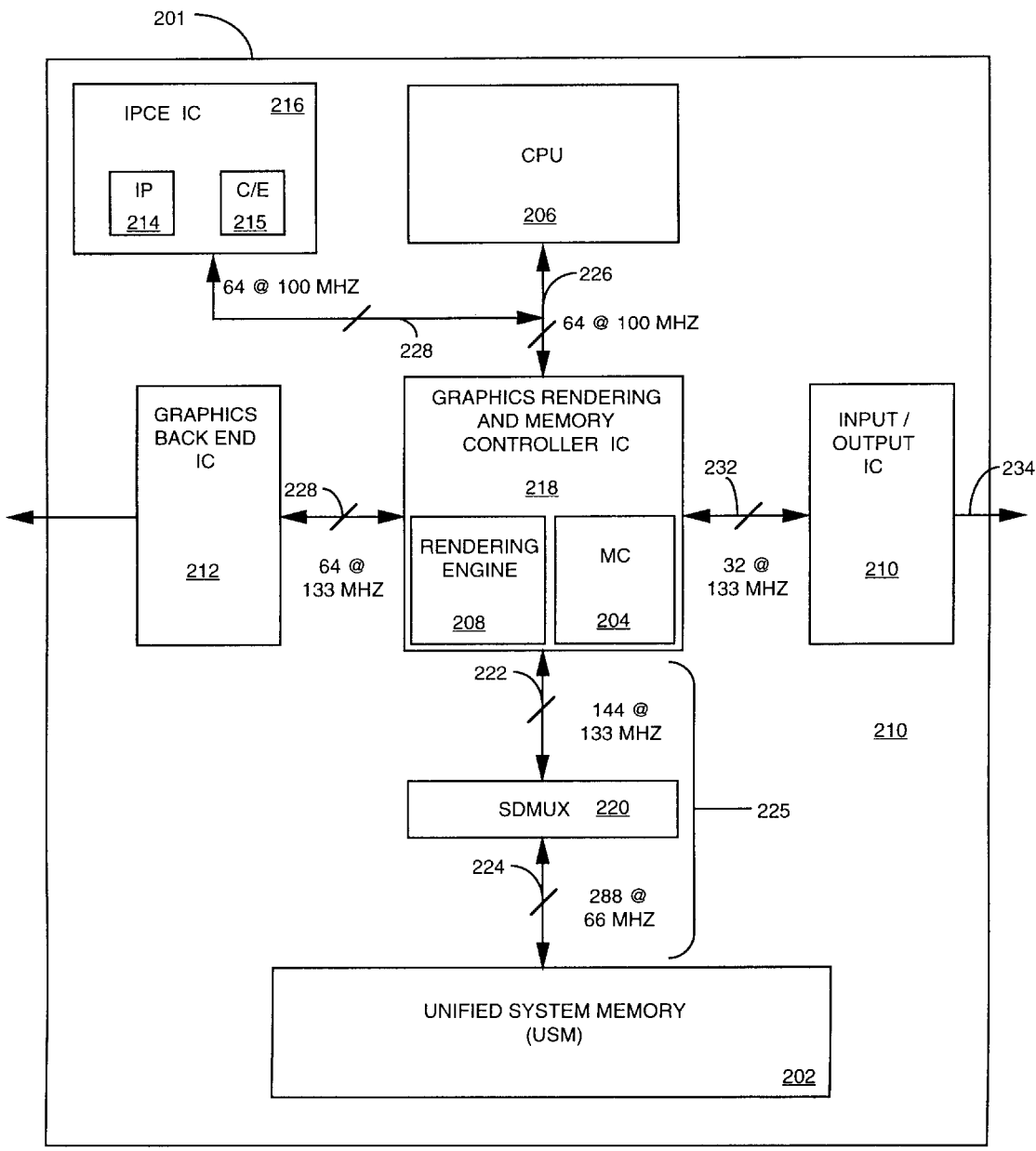
FIG. 2B is an internal circuit block diagram of a graphics rendering and memory controller IC including a memory controller (MC)and a graphics rendering engine integrated therein.

With reference to FIG. 2B, an exemplary computer system 201, according to the present invention, is shown. Computer system 201 includes the unified system memory 202 which is shared by various memory system clients including the CPU 206, the input/output IC 210, the graphics back end IC 212, an image processing and compression and expansion IC 216, and a graphics rendering and memory controller IC 218. The image processing and compression and expansion IC 216 includes the image processor 214, and a data compression and expansion unit 215. GRMC IC 218 includes the graphics rendering engine (rendering engine) 208 and the memory controller 204 integrated therein. The graphics rendering and memory controller IC 218 is coupled to unified system memory 202 via a high bandwidth memory data bus (HBWMD BUS) 225. In a preferred embodiment of the present invention, HBWMD BUS 225 includes a demultiplexer (SD-MUX) 220, a first BUS 222 coupled between the graphics rendering and memory controller IC 218 and SD-MUX 220, and a second bus 224 coupled between SD-MUX 220 and unified system memory 202. In the preferred embodiment of the present invention, BUS 222 includes 144 lines cycled at 133 MHz and BUS 224 includes 288 lines cycled at 66 MHz. SD-MUX 220 demultiplexes the 144 lines of BUS 222, which are cycled at 133 MHz, to double the number of lines, 288, of BUS 224, which are cycled at half the frequency, 66 MHz. CPU 206 is coupled to the graphics rendering and memory controller IC 218 by a third bus 226. In the preferred embodiment of the present invention, BUS 226 is 64 bits wide and carries signals cycled at 100 MHz. The image processing and compression and expansion IC 216 is coupled to BUS 226, by a third bus 228. In the preferred embodiment of the present invention, BUS 228 is 64 bits wide and carries signals cycled at 100 MHz. The graphics back end IC 212 is coupled to the graphics rendering and memory controller IC 218 by a fourth bus 230. In the preferred embodiment of the present invention, BUS 230 is 64 bits wide and carries signals cycled at 133 MHz. The input/output IC 210 is coupled to the graphics rendering and memory controller IC 218 by a fifth bus 232. In the preferred embodiment of the present invention, BUS 232 is 32 bits wide and carries signals cycled at 133 MHz.

The input/output IC 210 of FIG. 2A contains all of the input/output interfaces including: keyboard & mouse, interval timers, serial, parallel, ic, audio, video in & out, and fast ethernet. The input/output IC 210 also contains an interface to an external 64-bit PCI expansion bus, BUS 231, that supports five masters (two SCSI controllers and three expansion slots).

Figure 2C:
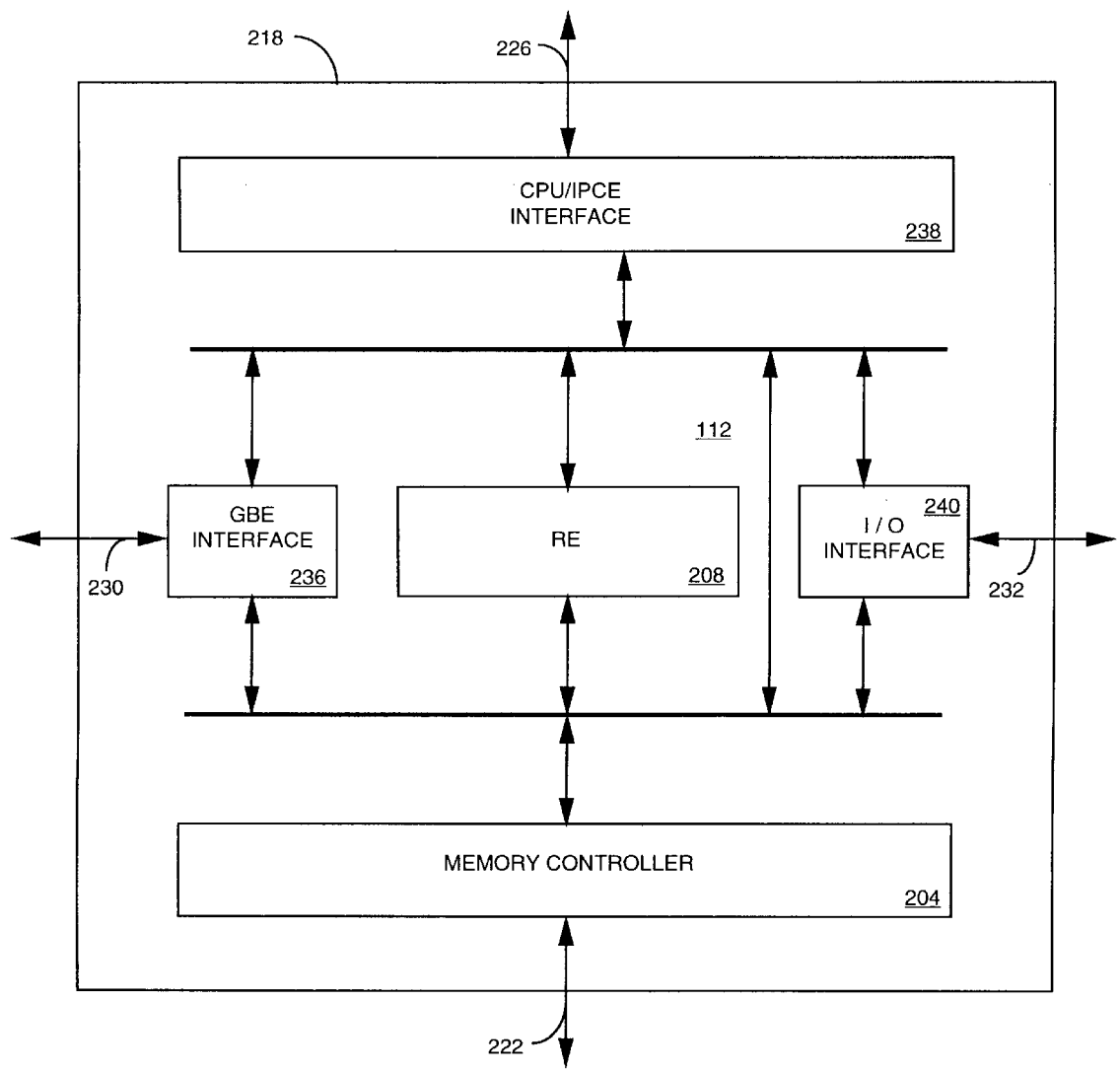
FIG. 2C is an internal circuit block diagram of the graphics rendering and memory controller IC of FIG. 2B.

With reference to FIG. 2C, an internal circuit block diagram is shown of the graphics rendering and memory controller IC 218 according to an embodiment of the present invention. As previously mentioned, rendering 20 engine 208 and memory controller 204 are integrated within the graphics rendering and memory controller IC 218. The graphics rendering and memory controller IC 218 also includes a CPU/IPCE interface 238, an input/output interface 240, and a GBE interface 236.

With reference to FIGS. 2A and 2B, GBE interface 232 buffers and transfers display data from unified system memory 202 to the graphics back end IC 212 in 16×32-byte bursts. GBE interface 232 buffers and transfers video capture data from the graphics back end IC 212 to unified system memory 202 in 16×32-byte bursts. GBE interface 232 issues GBE interrupts to CPU/IPCE interface 234. BUS 228, shown in both FIG. 2A and FIG. 2B, couples GBE interface 232 to the graphics back end IC 212 (FIG. 2A). The input/output interface 236 buffers and transfers data from unified system memory 202 to the input/output IC 210 in 8×32-byte bursts. The input/output interface 236 buffers and transfers data from the input/output IC 210 to unified system memory 202 in 8×32-byte bursts. The input/output interface 236 issues the input/output IC interrupts to CPU/IPCE interface 234. BUS 230, shown in both FIG. 2A and FIG. 2B, couples the input/output interface 236 to the input/output IC 210 (FIG. 2A). A bus, BUS 224, provides coupling between CPU/IPCE interface 234 and CPU 206 and the image processing and compression and expansion IC 216.

With reference to FIG. 2A, the memory controller 214 is the interface between memory system clients (CPU 206, rendering engine 208, input/output IC 210, graphics back end IC 212, image processor 214, and data compression/expansion device 215) and the unified system memory 202. As previously mentioned, the memory controller 214 is coupled to unified system memory 202 via HBWMD BUS 225 which allows fast transfer of large amounts of data to and from unified system memory 202. Memory clients make read and write requests to unified system memory 202 through the memory controller 214. The memory controller 214 converts requests into the appropriate control sequences and passes data between memory clients and unified system memory 202. In the preferred embodiment of the present invention, the memory controller 214 contains two pipeline structures, one for commands and another for data. The request pipe has three stages, arbitration, decode and issue/state machine. The data pipe has only one stage, ECC. Requests and data flow through the pipes in the following manner. Clients place their requests in a queue. The arbitration logic looks at all of the requests at the top of the client queues and decides which request to start through the pipe. From the arbitration stage, the request flows to the decode stage. During the decode stage, information about the request is collected and passed onto an issue/state machine stage.

With reference to FIG. 2A, the rendering engine 208 is a 2-D and 3-D graphics coprocessor which can accelerate rasterization. In a preferred embodiment of the present invention, the rendering engine 208 is also cycled at 66 MHz and operates synchronously to the unified system memory 202. The rendering engine 208 receives rendering parameters from the CPU 206 and renders directly to frame buffers stored in the unified system memory 202 (FIG. 2A). The rendering engine 208 issues memory access requests to the memory controller 214. Since the rendering engine 208 shares the unified system memory 202 with other memory clients, the performance of the rendering engine 208 will vary as a function of the load on the unified system memory 202. The rendering engine 208 is logically partitioned into four major functional units: a host interface, a pixel pipeline, a memory transfer engine, and a memory request unit. The host interface controls reading and writing from the host to programming interface registers. The pixel pipeline implements a rasterization and rendering pipeline to a frame buffer. The memory transfer engine performs memory bandwidth byte aligned clears and copies on both linear buffers and frame buffers. The memory request unit arbitrates between requests from the pixel pipeline and queues up memory requests to be issued to the memory controller 214.

The computer system 200 includes dynamic memory allocation of virtual pixel buffers in the unified system memory 202. Pixel buffers include frame buffers, texture maps, video maps, image buffers, etc. Each pixel buffer can include multiple color buffers, a depth buffer, and a stencil buffer. In the present invention, pixel buffers are allocated in units of contiguous memory called tiles and address translation buffers are provided for dynamic allocation of pixel buffers.

Figure 3A:
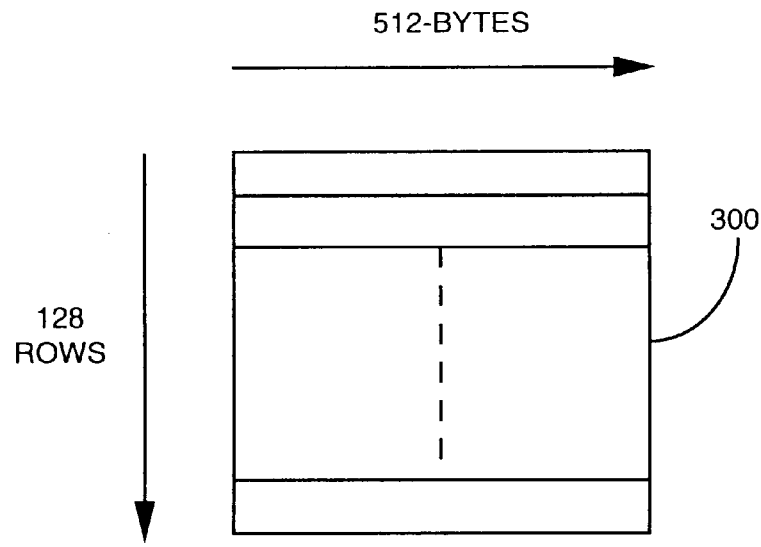
FIG. 3A is an illustration of an exemplary tile for dynamic allocation of pixel buffers according to the present invention.

With reference to FIG. 3A, an illustration is shown of an exemplary tile 300 for dynamic allocation of pixel buffers according to the present invention. In a preferred embodiment of the present invention, each tile 300 includes 64 kilobytes of physically contiguous memory. A 64 kilobyte tile size can be comprised of 128×128 pixels for 32 bit pixels, 256×128 pixels for 16 bit pixels, or 512×128 pixels for 8 bit pixels. In the present invention, tiles begin on 64 kilobyte aligned addresses. An integer number of tiles can be allocated for each pixel buffer. For example, a 200×200 pixel buffer and a 256×256 pixel buffer would both require four (128–128) pixel tiles.

Figure 3B:
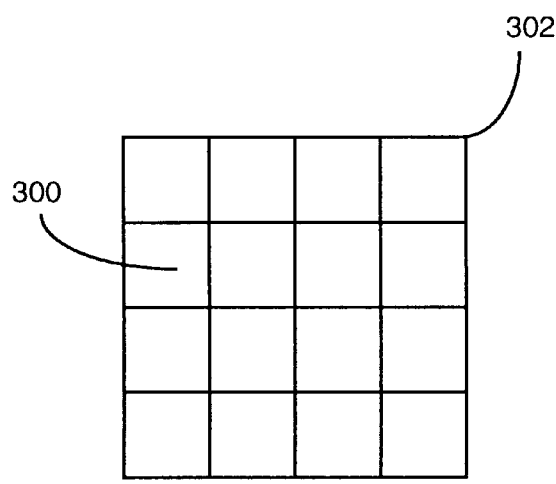
FIG. 3B is an illustration of an exemplary pixel buffer comprised of $n^2$ tiles according to the present invention.

With reference to FIG. 3B, an illustration is shown of an exemplary pixel buffer 302 according to the present invention. In the computer system 200 of the present invention, translation hardware maps virtual addresses of pixel buffers 302 to physical memory locations in unified system memory 202. Each of the computational units of the computer system 200 (image processing and compression and expansion IC, 212, graphics back end IC 212, The input/output IC 210, and rendering engine 208) includes translation hardware for mapping virtual addresses of pixel buffers 302 to physical memory locations in unified system memory 202. Each pixel buffer 302 is partitioned into $n^2$ tiles 300, where n is an integer. In a preferred embodiment of the present invention, n=4.

The rendering engine 208 supports a frame buffer address translation buffer (TLB) to translate frame buffer (x,y) addresses into physical memory addresses. This TLB is loaded by CPU 206 with the base physical memory addresses of the tiles which compose a color buffer and the stencil-depth buffer of a frame buffer. In a preferred embodiment of the present invention, the frame buffer TLB has enough entries to hold the tile base physical memory addresses of a 2048×2048 pixel color buffer and a 2048×2048 pixel stencil-depth buffer. Therefore, the TLB has 256 entries for color buffer tiles and 256 entries for stencil-depth buffer tiles.

Tiles provide a convenient unit for memory allocation. By allowing tiles to be scattered throughout memory, tiling makes the amount of memory which must be contiguously allocated manageable. Additionally, tiling provides a means of reducing the amount of system memory consumed by frame buffers. Rendering to tiles which do not contain any pixels pertinent for display, invisible tiles, can be easily clipped out and hence no memory needs to be allocated for these tiles. For example, a 1024×1024 virtual frame buffer consisting of front and back RGBA buffers and a depth buffer would consume 12 Mb of memory if fully resident. However, if each 1024×1024 buffer were partitioned into 64 (128×128) tiles of which only four tiles contained non-occluded pixels, only memory for those visible tiles would need to be allocated. In this case, only 3 MB would be consumed.

In the present invention, memory system clients (e.g., CPU 206, rendering engine 208, input/output IC 210, graphics back end IC 212, image processor 214, and data compression/expansion device 215) share the unified system memory 202. Since each memory system client has access to memory shared by each of the other memory system clients, there is no need for transferring data from one dedicated memory unit to another. For example, data can be received by the input/output IC 210, decompressed (or expanded) by the data compression/expansion device 215, and stored in the unified system memory 202. This data can then be accessed by the CPU 206, the rendering engine 208, the input/output IC 210, the graphics back end IC 212, or the image processor 214. As a second example, the CPU 206, the rendering engine 208, the input/output IC 210, the graphics back end IC 212, or the image processor 214 can use data generated by the CPU 206, the rendering engine 208, the input/output IC 210, the graphics back end IC 212, or the image processor 214. Each of the computational units (CPU 206, input/output IC 210, the graphics back end IC 212, the image processing and compression and expansion IC 216, the graphics rendering and memory controller IC 218, and the data compression/expansion device 215) has translation hardware for determining the physical addresses of pixel buffers as is discussed below.

There are numerous video applications for which the present invention computer system 200 provides functional advantages over prior art computer system architectures. These applications range from video conferencing to video editing. There is significant variation in the processing required for the various applications, but a few processing steps are common to all applications: capture, filtering, scaling, compression, blending, and display. In operation of computer system 200, input/output IC 210 can bring in a compressed stream of video data which can be stored into unified system memory 202. The input/output IC 210 can access the compressed data stored in unified system memory 220, via a path through the graphics rendering and memory controller IC 218. The input/output IC 210 can then decompress the accessed data and store the decompressed data into unified system memory 202. The stored image data can then be used, for example, as a texture map by rendering engine 208 for mapping the stored image onto another image. The resultant image can then be stored into a pixel buffer which has been allocated dynamically in unified system memory 202. If the resultant image is stored into a frame buffer, allocated dynamically in unified system memory 202, then the resultant image can be displayed by the graphics back end IC 212 or the image can be captured by writing the image back to another pixel buffer which has been allocated dynamically in unified system memory 202. Since there is no necessity of transferring data from one dedicated memory unit to another in computer system 200, functionality is increased.

In the preferred embodiment of the present invention, unified system memory 202 of FIG. 2A is implemented using synchronous DRAM (SDRAM) accessed via a 256-bit wide memory data bus cycled at 66 MHz. A SDRAM is made up of rows and columns of memory cells. A row of memory cells is referred to as a page. A memory cell is accessed with a row address and column address. When a row is accessed, the entire row is placed into latches, so that subsequent accesses to that row only require the column address. Accesses to the same row are referred to as page accesses. In a preferred embodiment of the present invention, unified system memory 202 provides a peak data bandwidth of 2.133 Gb/s. Also, in a preferred embodiment of the present invention, unified system memory 202 is made up of 8 slots. Each slot can hold one SDRAM DIMM. A SDRAM DIMM is constructed from 1M×16 or 4M×16 SDRAM components and populated on the front only or the front and back side of the DIMM. Two DIMMs are required to make an external SDRAM bank. 1M×16 SDRAM components construct a 32 Mbyte external bank, while 4M×16 SDRAM components construct a 128 Mbyte external bank. unified system memory 202 can range in size from 32 Mbytes to 1 Gbyte.

Figure 3C:
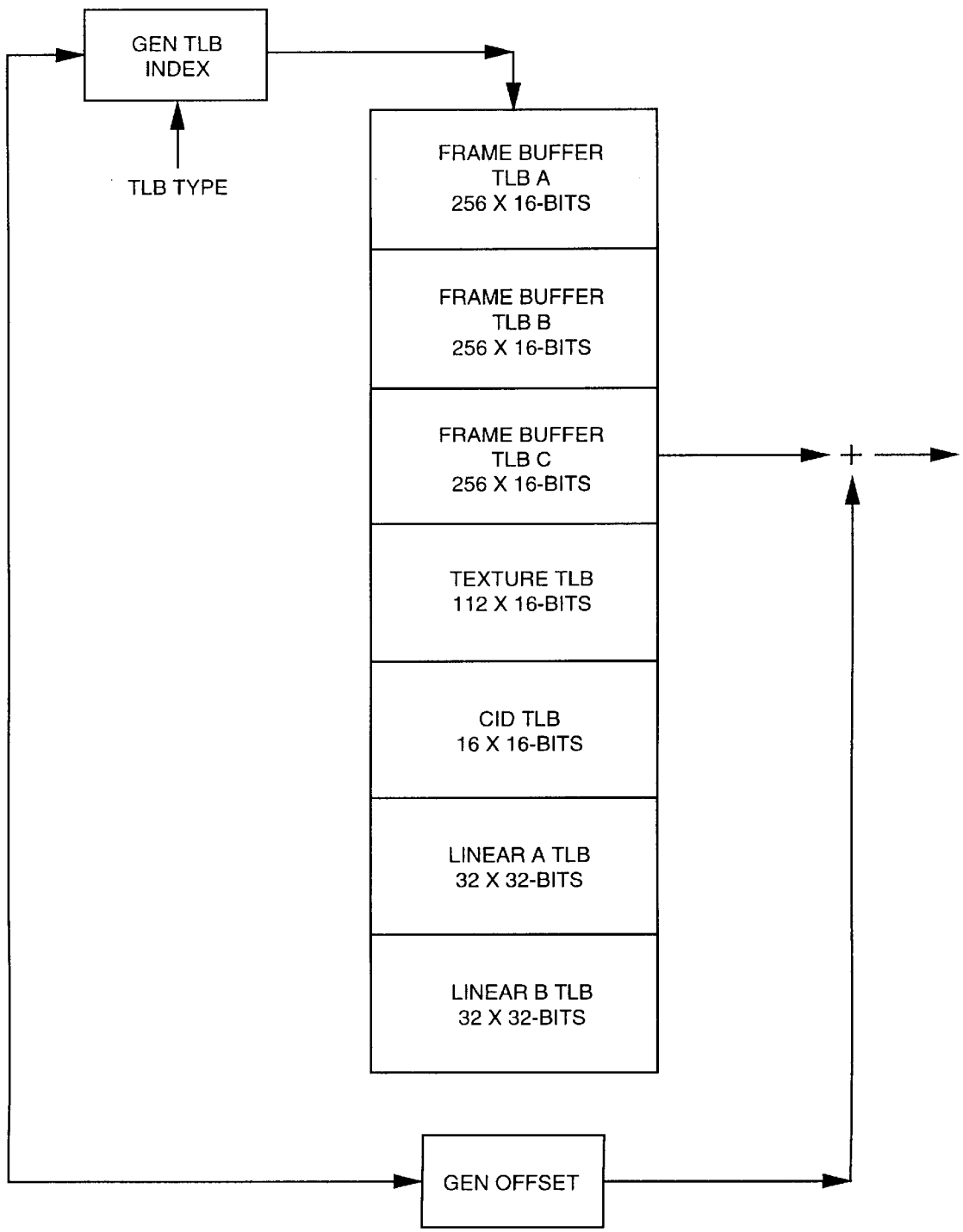
FIG. 3C is a block diagram of an address translation scheme according to the present invention.
Figure 4:
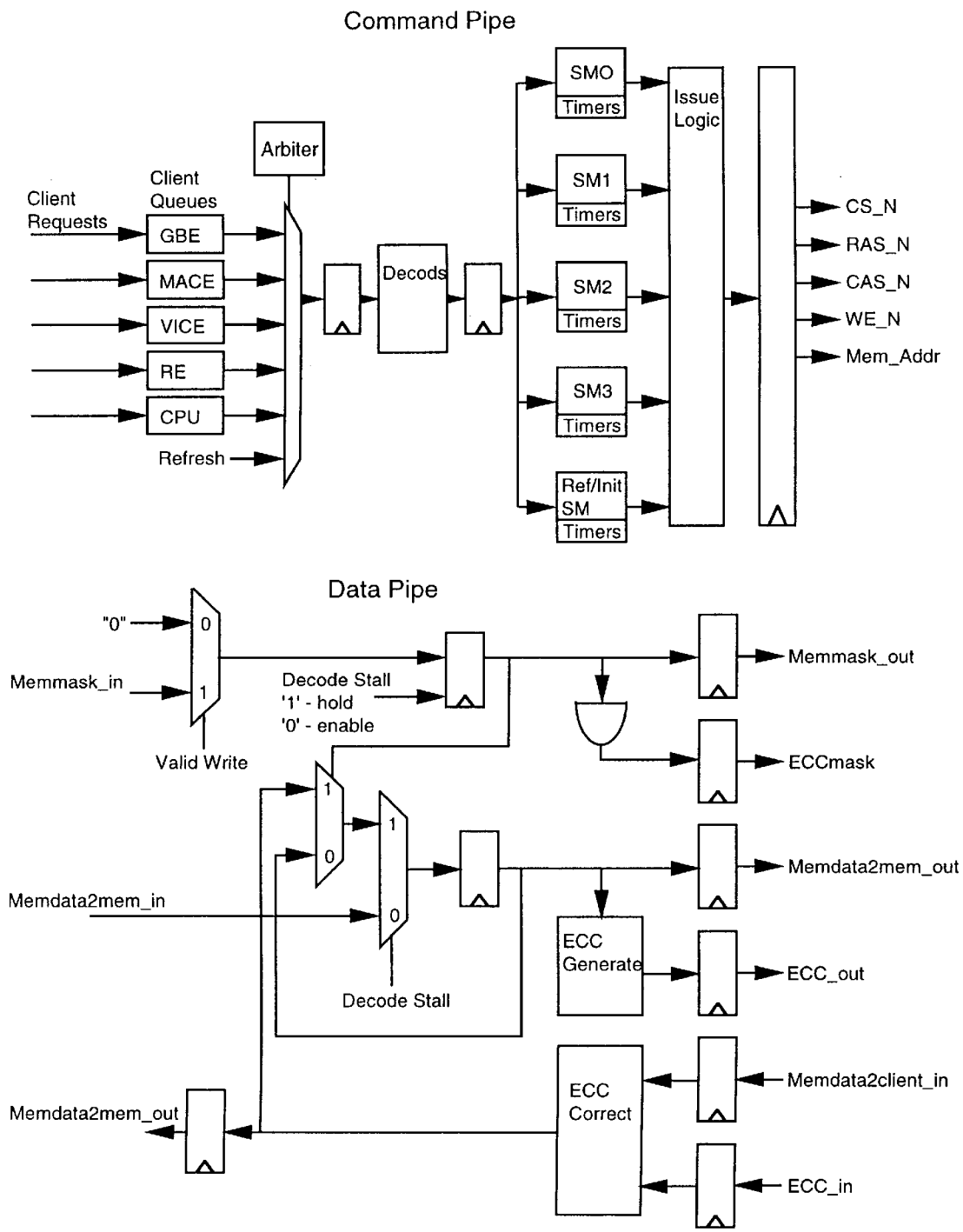
FIG. 4 is a block diagram of a memory controller according to the present invention.

FIG. 3C shows a block diagram of an address translation scheme according to the present invention. FIG. 4 shows a block diagram of the memory controller 204 of the present invention.

A memory client interface contains the signals listed in Table 1, below.

TABLE 1

Memory client interface signals

| Signal | CRIME Pin Name | # of Bits | Dir. | Description |
|---|---|---|---|---|
| clientreq.cmd | internal only | 3 | in | type of request - 1 - read 2 - write 4 - rmw |
| clientreq.adr | internal only | 25 | in | address of request |
| clientreq.msg | internal only | 7 | in | message sent with request |
| clientreq.v | internal only | 1 | in | 1 - valid 0 - not valid |
| clientreq.ecc | internal only | 1 | in | 1 - ecc is valid 0 - ecc not valid |
| clientres.gnt | internal only | 1 | out | 1 - room in client queue 0 - no room |
| clientres.wrrdy | internal only | 1 | out | 1 - MC is ready for write data 0 - MC not ready for write data |
| clientres.rdrdy | internal only | 1 | out | 1 - valid read data 0 - not valid read data |
| clientres.oe | internal only | 1 | out | 1 - enable client driver 0 - disable client driver |
| clientres.rdmsg | internal only | 7 | out | read message sent with read data |
| clientres.wrmsg | internal only | 7 | out | write message sent with wrrdy |
| memdata2-mem_in | internal only | 256 | out | memory data from client going to unified system memory |
| memmask_in | internal only | 32 | in | memory mask from client going to unified system memory 0 - write byte 1 - don't write byte memmask_in (0) is matched with memdata2mem_in (7:0) and so on. |
| memdata2-client_out | internal only | 256 | out | memory data from unified system memory going to the client |

Figure 5:
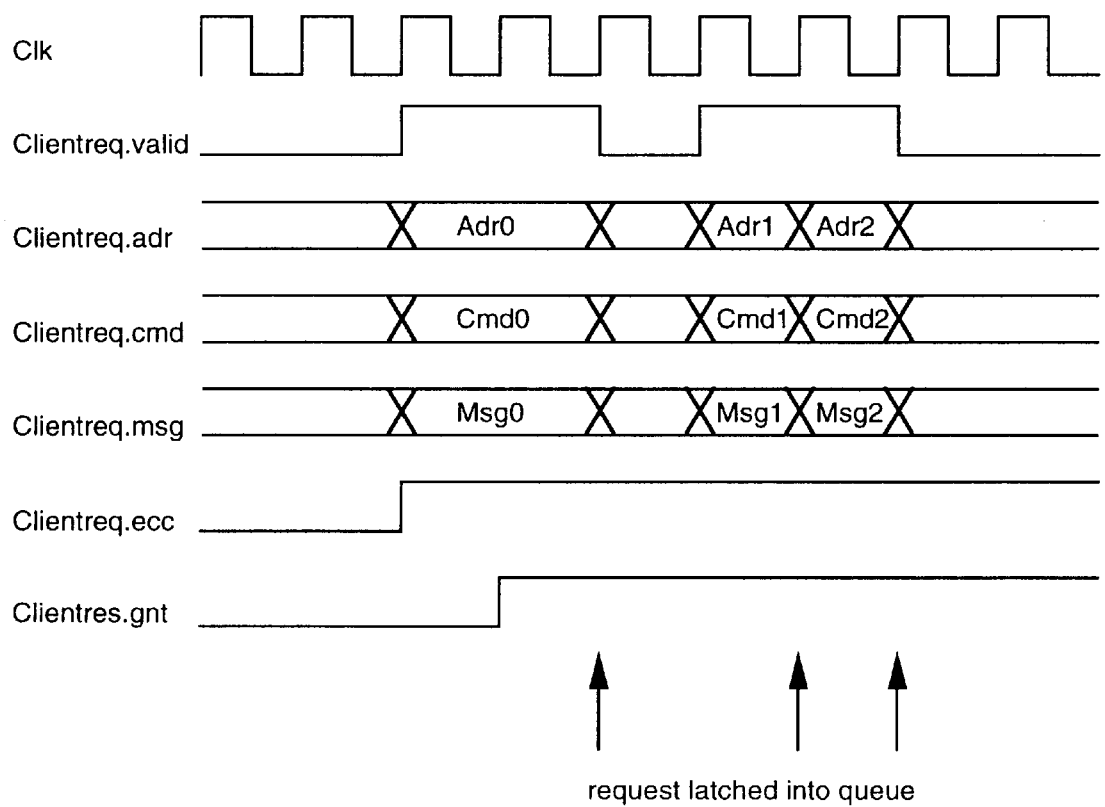
FIG. 5 is a timing diagram for memory client requests issued to the unified system memory according to the present invention.

With reference to FIG. 5, a timing diagram for memory client requests is shown. A memory client makes a request to the memory controller 204 by asserting clientreq.valid while setting the clientreq.adr, clientreq.msg, clientreq.cmd and clientreq.ecc lines to the appropriate values. If there is room in the queue, the request is latched into the memory client queue. Only two of the memory clients, the rendering engine 208 and the input/output IC 210, use clientreq.msg. The message specifies which subsystem within the input/output IC 210 or the rendering engine 208 made the request. When an error occurs, this message is saved along with other pertinent information to aid in the debug process. For the rendering engine 208, the message is passed through the request pipe and returned with other pertinent information to aid in the debug process. For the rendering engine 208, the message is passed through the request pipe and returned with the clientreq.wrrdy signal for a write request or with the clientreq.rdrdy signal for a read request. The rendering engine 208 uses the information contained in the message to determine which rendering engine 208 queue to access.

Figure 6:
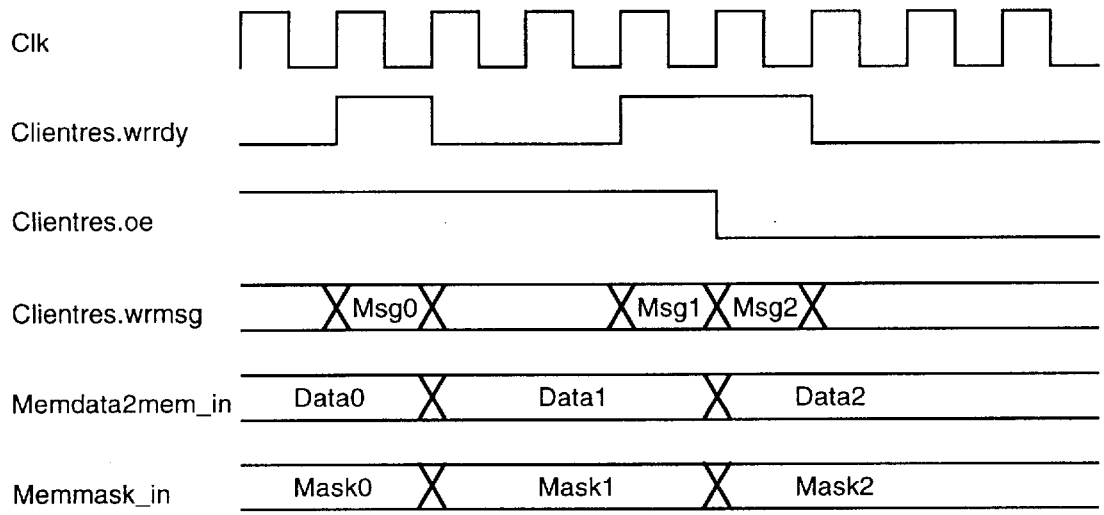
FIG. 6 is a timing diagram for memory client write data according to the present invention.

With reference to FIG. 6, a timing diagram for memory client write data is shown. The data for a write request is not latched with the address and request. Instead, the data, mask and message are latched when the memory controller 204 asserts the clientreq.wrrdy indicating that the request has reached the decode stage of the request pipe. Because the memory client queues are in front of the request pipe, there is not a simple relationship between the assertion clientreq.gnt and clientreq. wrrdy. Clientreq.msg is only valid for the rendering engine 208 and the input/output IC 210. The memory controller 204 asserts the clientreq.oe signal at least one cycle before the assertion of clientreq.wrrdy. Clientreq.oe is latched locally by the memory client and is used to turn on the memory client's memory data bus drivers.

Figure 7:
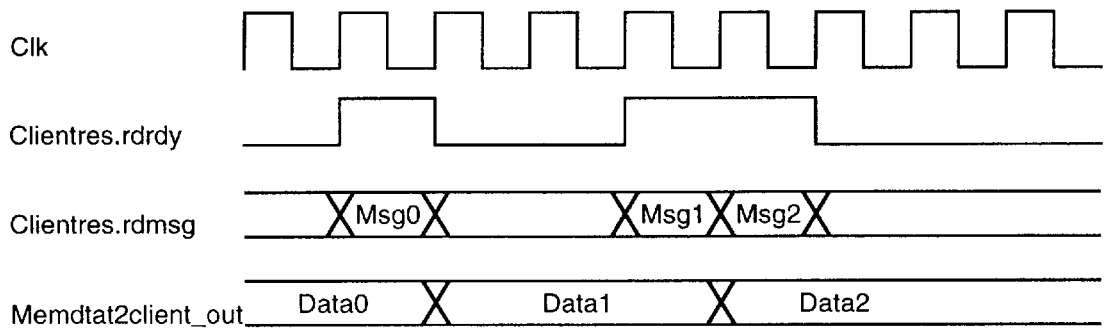
FIG. 7 is a timing diagram for memory client read data according to the present invention.

With reference to FIG. 7, a timing diagram for memory client read data is shown. The read data is sent to the memory client over the memdata2client_out bus. When clientres.rdrdy is asserted, the data and message are valid.

A memory client interface contains the signals listed in Table 2, below.

returned to the memory client. Ras_n, cas_n, we_n and cs_n are control signals for the unified system memory 202.

Figure 8:
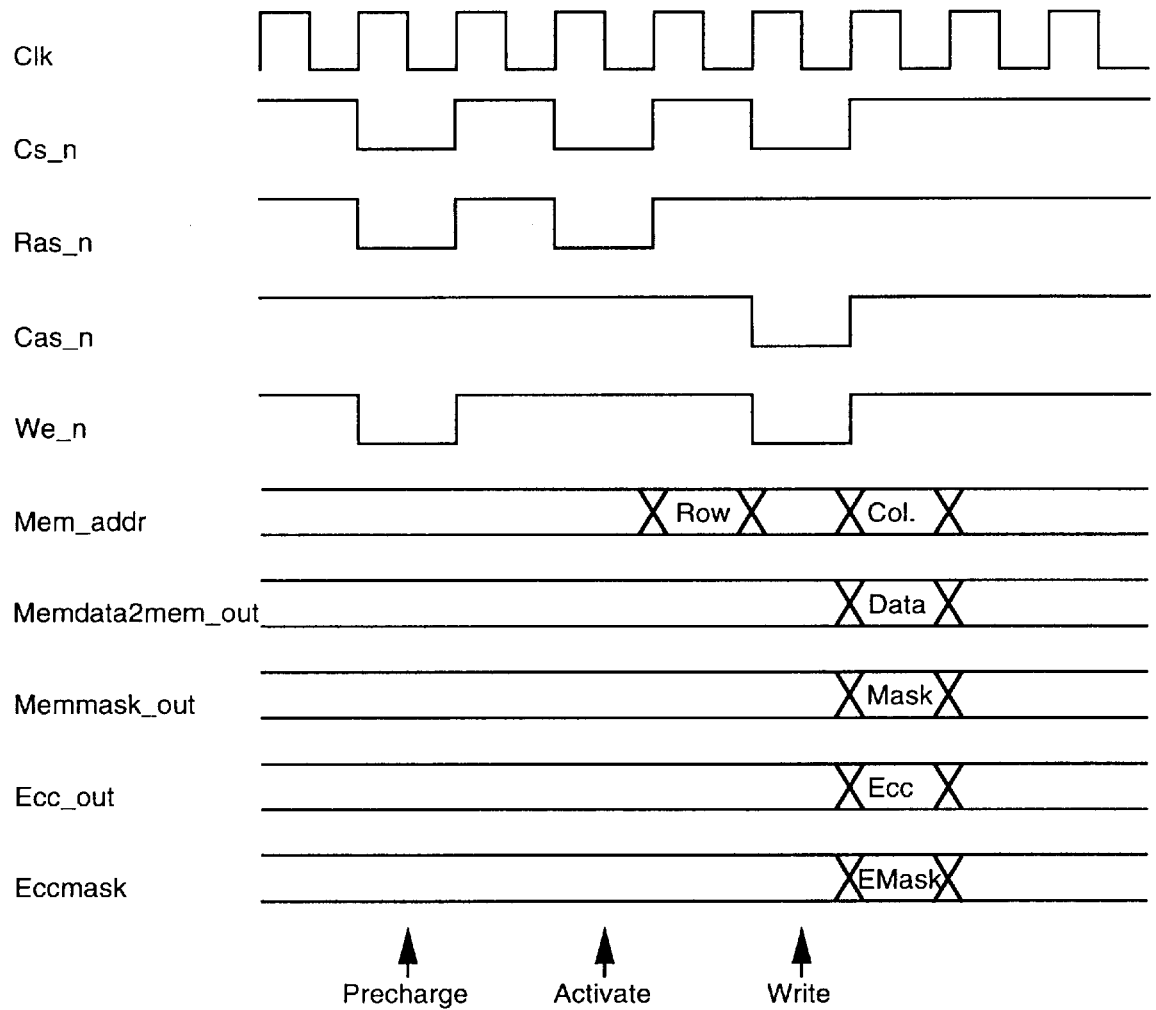
FIG. 8 is a timing diagram for an exemplary write to a new page performed by the unified system memory according to the present invention.
Figure 9:
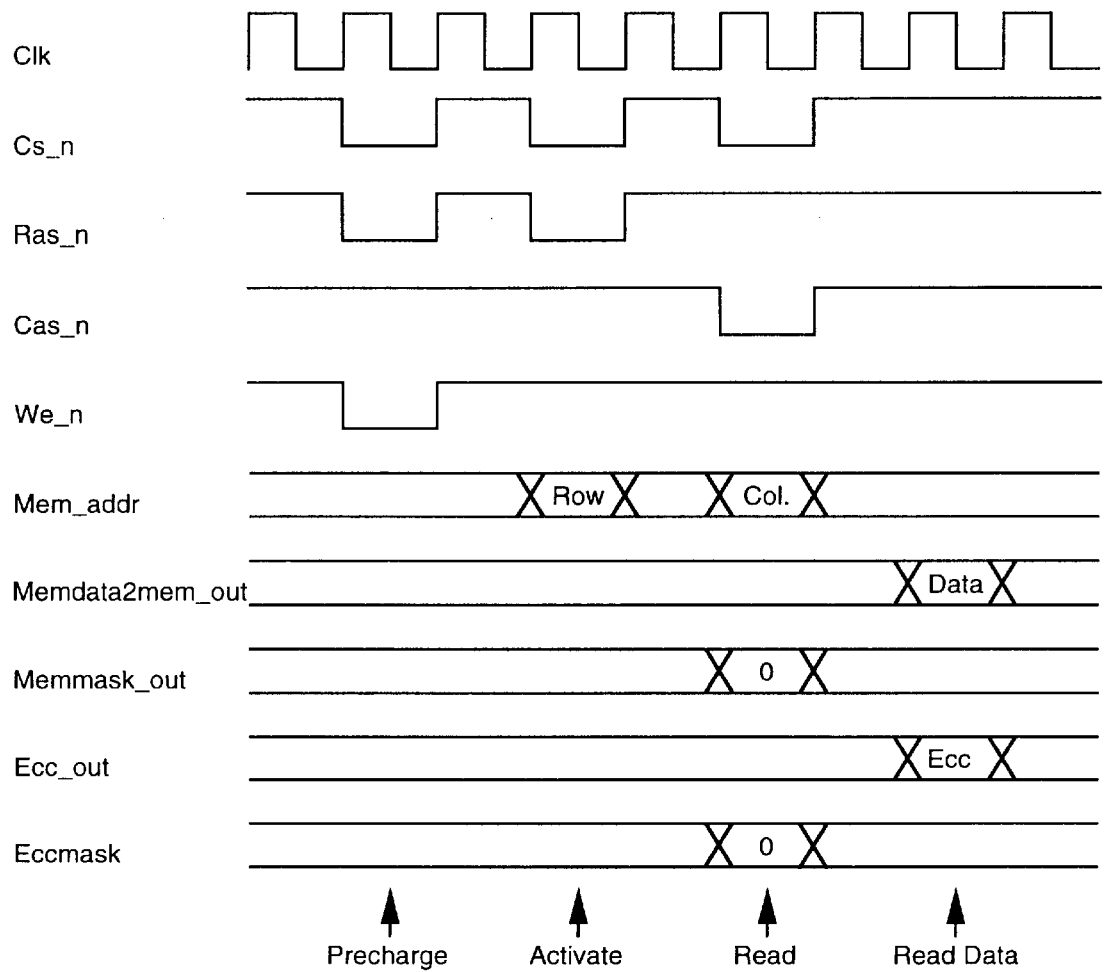
FIG. 9 is a timing diagram for an exemplary read to a new page performed by the unified system memory according to the present invention.

With reference to FIG. 8, a timing diagram is shown for an exemplary write to a new page performed by the unified system memory 202. With reference to FIG. 9, a timing diagram is shown for an exemplary read to a new page performed by the unified system memory 202. A read or write operation to the same SDRAM page is the same as the operation shown in FIGS. 8 and 9, except a same page operation does not need the precharge and activate cycles.

A request pipe is the control center for the memory controller 204. Memory client requests are placed in one end of the pipe and come out the other side as memory commands. The memory client queues are at the front of the pipe, followed by the arbitration, then the decode, and finally the issue/state machine. If there is room in their queue, a memory client can place a request in it. The arbitration logic looks at all of the requests at the top of the memory client queues and decides which request to start through the request pipe. From the arbitration stage, the request flows to the decode stage. During the decode stage, information about the request is collected and passed onto the issue/state machine stage. Based on this information, a state machine determines the proper sequence of commands for the unified system memory 202. The later portion of the issue stage decodes the state of the state machine into control signals that are latched and then sent across to the unified system

TABLE 2

Memory Interface Signals

| Signal | Crime Pin Name | # of Bits | Dir. | Description |
| --- | --- | --- | --- | --- |
| memwrite | mem_dir | 1 | out | controls direction of SDMUX chips- default to write |
| memdata2mem_out | mem_data | 256 | out | memory data from client going to unified system memory |
| memdata2client_out | internal only | 256 | out | memory data from main memory going to the memory client |
| memmask_out | mem_mask | 32 | out | memory mask from client going to unified system memory |
| memdataoe | internal only | 3 | out | enable memory data bus drivers |
| ecc_out | mem_ecc | 32 | out | ecc going to unified system memory |
| eccmask | mem_eccmask | 32 | out | ecc mask going to main memory |
| mem_addr | mem_addr | 14 | out | memory address |
| ras_n | mem_ras_n | 1 | out | row address strobe |
| cas_n | mem_cas_n | 1 | out | column address strobe |
| we_n | mem_we_n | 1 | out | write enable |
| cs_n | mem_cs(3:0)_n | 8 | out | chip selects |

The data and mask are latched in the data pipe and flow out to the unified system memory 202 on memmask_out and memdata2mem_out. From the data and mask, the ECC and ECC mask are generated and sent to the unified system memory 202 across eccmask and ecc_out. The memdataoe signal is used to turn on the memory bus drivers. Data and ECC from the unified system memory 202 come in on the memdata2client_in and ecc_in busses. The ECC is used to determine if the incoming data is correct. If there is a one bit error in the data, the error is corrected, and the corrected data is sent to the memory client. If there is more than one bit in error, the CPU 206 is interrupted, and incorrect data is memory 202. A request can sit in the issue stage for more than one cycle. While a request sits in the issue/state machine stage, the rest of the request pipe is stalled. Each stage of the request pipe is discussed herein.

All of the memory clients have queues, except for refresh. A refresh request is guaranteed to retire before another request is issued, so a queue is not necessary. The five memory client queues are simple two-port structures with the memory clients on the write side and the arbitration logic on the read side. If there is space available in a memory client queue, indicated by the assertion of clientres.gnt, a memory client can place a request into its queue. A memory client request consists of an address, a command (read, write or read-modify-write), a message, an ECC valid and a request valid indication. If both clientreq.valid and clientres.gnt are asserted, the request is latched into the memory client queue. If the pipeline is not stalled, the arbitration logic looks at all of the requests at the top of the memory client queues and determines which request to pop off and pass to the decode stage of the requests at the top of the memory client queues and determines which request to pop off and pass to the decode stage of the request pipe.

Because there is a request queue between the memory client and the arbiter, the clientres.gnt signal does not indicate that the request has retired. The request still needs to go through the arbitration process. To put it another way, memory client A might receive the clientres.gnt signal before memory client B, but if memory client B has a higher priority, its request might retire before the request from memory client A.

Arbiter

As stated above, the arbiter determines which memory client request to pass to the decode stage of the request pipe. This decision process has two steps. The first step is to determine if the arbitration slot for the current memory client is over or not. An arbitration slot is series of requests from the same memory client. The number and type of requests allowed in one arbitration slot varies. Table 3, below, lists what each memory client can do in an arbitration slot.

TABLE 3

Requests allowed in a Arbitration Slot

| Client | Possible Operations |
|---|---|
| Graphics Back End | <=16 memory word read with no page crossings<br><=16 memory word write with no page crossings |
| IPCE IC | <=8 memory word read with 1 page crossings<br><=8 memory word write with 1 page crossings<br>1 read-modify-write operation |
| rendering engine, CPU, GRMC | <=8 memory word read with no page crossings<br><=8 memory word write with no page crossings<br>1 read-modify-write operation |
| REFRESH | refresh 2 rows |

Based on a state for the current arbitration slot and the next request from the current slot owner, the arbiter determines if the arbitration slot should end or not. If not, the request from the memory client who owns the current arbitration slot is passed to the decode stage. If the current arbitration slot is terminated, the arbiter uses the results from an arbitration algorithm to decide which request to pass to the decode stage. The arbitration algorithm to decide which request to pass to the decode stage. The arbitration algorithm ensures that the graphics back end IC 212 gets ½ of the arbitration slots, the input/output IC 210 gets ¼, the image processing and compression and expansion IC 216 gets ⅛, the rendering engine 208 gets ¹⁄₁₆, the CPU 206 gets ¹⁄₃₂, and the refresh gets ¹⁄₆₄.

Predicting the average bandwidth for each memory client is difficult, but the worst-case slot frequency per memory client can be calculated. The first step is to determine the maximum number of cycles that each memory client can use during an arbitration slot. Table 4, below, shows the number of cycles associated with each type of operation. With reference to Table 4, below, "P" refers to precharge, "X" refers to a dead cycle, "A" refers to activate, "R0" refers to "read word 0", "W0" refers to "write word 0", and "Ref" refers to "refresh".

TABLE 4

Maximum Cycles for a Memory Operation

| Operation | Command Sequence | # of Cycles |
|---|---|---|
| 8 Word Read | P X A X R0 R1 R1 R3 R4 R5 R6 R7 | 12 |
| 8 Word Write | P X A X W0 W1 W2 W3 W4 W5 W6 W7 | 12 |
| Read-Modify-Write | P X AX R0 X X X X X X W0 | 12 |
| 8 Word Vice Read with page crossing | P X A X R0 XX P X AX R1 R2 R3 R4 R5 R6 R7 | 18 |
| 2 Row Refresh | P X Ref X X X X X Ref X X X X X | 14 |

Table 5, below, refers to the maximum number of cycles for each of the memory clients.

TABLE 5

Maximum # Cycles per Slot

| Memory Client | Operation | # of cycles |
|---|---|---|
| Graphics Back End | 16 memory word read or write | 20 cycles |
| CPU, Rendering Engine, MACE | 8 memory word read or write | 12 cycles |
| IPCE | 8 memory word read or write 1 page crossings | 18 cycles |
| REFRESH | refresh 2 rows | 14 cycles |

Finally, slots per second for each memory client can be calculated. If all of the memory clients are requesting all of the time, every memory client will get a turn after 64 slots. This is referrred to as a "round". In that round, the graphics back end gets 32 out of the 64 slots, the input/output IC 210 gets 16 out of the 64 slots etc., so a round takes 32*20+ 8*18+4*12+2*12+14=1062 cycles.

TABLE 6

Slot Frequency for Each Client

| Client | | Bandwidth f slot is fully utilized |
|---|---|---|
| GBE | 32 slots/15.93 us slot/0.50 us | 1 GB/sec |
| MACE | slot/1.00 us | 256 MB/sec |
| VICE | slot/2.00 us | 128 MB/sec |
| RE | slot/4.00 | 64 MB/sec |
| CPU | slot/8.00 us | 32 MB/sec |
| Refresh | slot/16.00 us | NA |

Decode Logic

The decode logic receives requests from the arbiter. Based on state maintained from the previous requests and information contained in the current request, the decode logic determines which memory bank to select, which of the four state machines in the next stage will handle the request, and whether or not the current request is on the same page as the previous request. This information is passed to the issue/state machine stage.

The unified system memory 202 is made up of 8 slots. Each slot can hold one SDRAM DIMM. A SDRAM DIMM is constructed from 1M×16 or 4M×16 SDRAM components and populated on the front only or the front and back side of the DIMM. Two DIMMs are required to make an external SDRAM bank. 1M×16 SDRAM components construct a 32 Mbyte external bank, while 4M×16 SDRAM components construct a 128 Mbyte external bank. The memory system can range in size from 32 Mbytes to 1 Gbyte.

Each SDRAM component has two internal banks, hence two possible open pages. The maximum number of external banks is 8 and the maximum number of internal banks is 8 and the maximum number of internal banks is 16. The memory controller 204 only supports 4 open pages at a time. This issue will be discussed in detail later in this section.

The decode logic is explained below in more detail. During initalization, software probes the memory to determine how many banks of memory are present and the size of each bank. Based on this information, the software programs the 8 bank control registers. Each bank control register (please refer to the register section) has one bit that indicates the size of the bank and 5 bits for the upper. address bits of that bank. Software must place the 64 Mbit external banks in the lower address range followed by any 16 Mbit external banks. This is to prevent gaps in the memory. The decode logic compares the upper address bits of the incoming request to the 8 bank control registers to determine which external bank to select. The number of bits that are compared is dependent on the size of the bank. For example, if the bank size is 64 Mbit, the decode logic compares bits 24:22 of the request address to bits 4:2 of the bank control register. If there is a match, that bank is selected. Each external bank has a separate chip select. If an incoming address matches more than one bank's control register, the bank with the lowest number is selected. If an incoming address does not match any of the bank control registers, a memory address error occurs. When an error occurs, pertinent information about the request is captured in error registers and the processor is interrupted—if the memory controller 204 interrupt is enabled. The request that caused the error is still sent to the next stage in the pipeline and is processed like a normal request, but the memory controller 204 deasserts all of the external bank selects so that the memory operation doesn't actually occur. Deasserting the external bank selects is also done when bit 6 of the rendering engine 208 message is set. The rendering engine 208 sets this bit when a request is generated using an invalid TLB entry.

Figure 10:
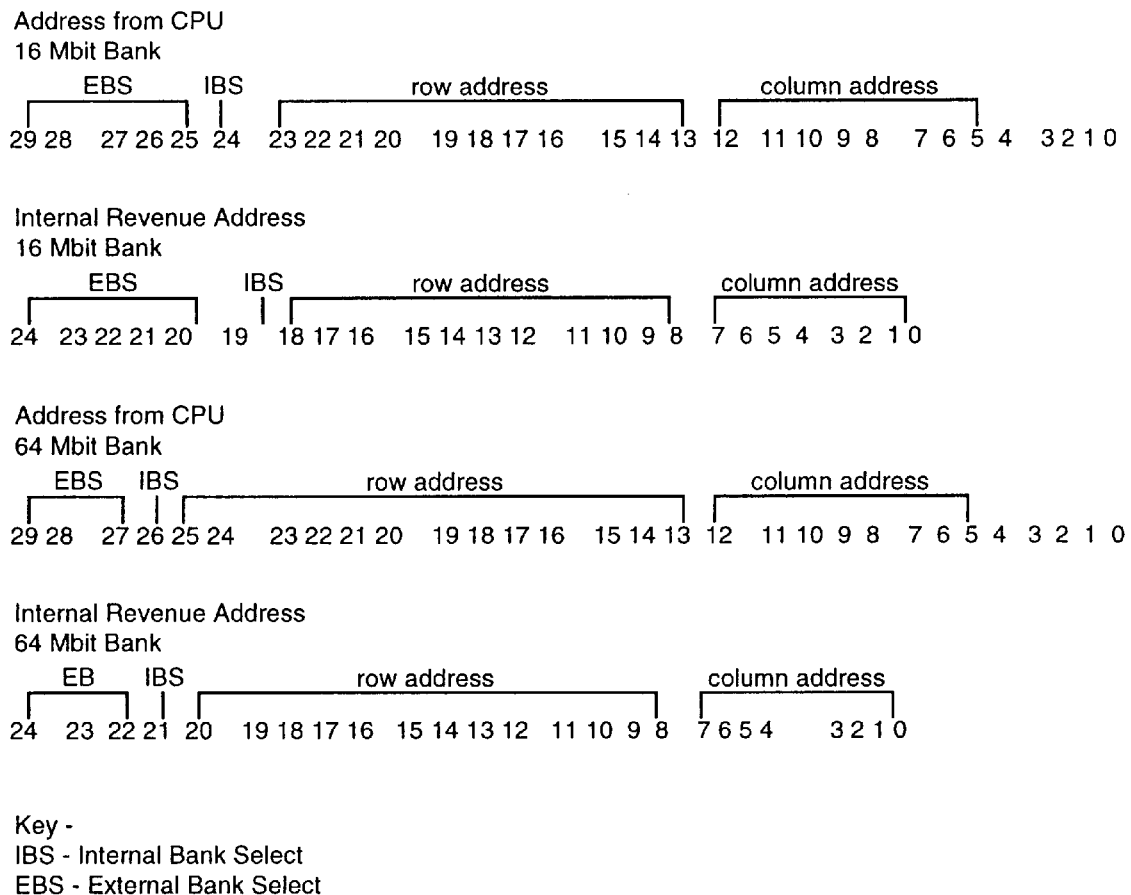
FIG. 10 shows external banks of the memory controller according to the present invention.

With reference to FIG. 10, although the memory controller 204 can handle any physical external bank configuration, we recommend that external bank 0 always be filled and that the external banks be placed in decreasing density order (for example a 64 Mbit external bank in bank 0 and a 16 Mbit external bank in bank 2).

The previous paragraph describes how the decode logic determines what external bank to select. This paragraph describes the method for determining page crossings and which bank state machine to use in the next stage of the pipeline. The row address, along with the internal and external bank bits for previous requests, are kept in a set of registers which are referred to as the row registers. Each row register corresponds to a bank state machine. There are four row registers (hence four bank state machines), so the decode logic can kept track of up to four open pages. The decode logic compares the internal/external bank bits of the new request with the four row registers. If there is a match, then bank state machine corresponding to that row register is selected. If the new request does not match any of the row registers, one of the row registers, one of the row registers is selected and the register is updated with the new request information. If the internal/external bank bits match one of the row registers and the row bits of the new request match the row bits in that register, then request is on the same page otherwise it is not.

State Machines and Issue Logic

The decode logic passes the request along with the external bank selects, state machine select and same page information to the issue/state machine stage. The selected bank state machine sequences through the proper states, while the issue logic decodes the state of the bank state machine into commands that are sent to the SDRAM DIMMS. In addition to the four bank state machines, there is a state machine dedicated to refresh and initialization operations. The initialization/refresh state machine sequences through special states for initialization and refresh while the four bank state machines are forced to an idle state. The bank state machines and the initialization/refresh state machine are discussed in more detail in more detail in the following sections.

Bank State Machines

The four bank state machines operate independently, subject only to conflicts for access to the control, address, and data signals. The bank state machines default to page mode operation. That is, the autoprecharge commands are not used, and the SDRAM bank must be explicitly precharged whenever there is a non-page-mode random reference. The decode state passes the request along with the page information to the selected state machine which sequences through the proper states. At certain states, interval timers are stated that inhibit the state machine from advancing to the next state until the SDRAM minimum interval requirements have been met. The bank state machines operate on one request at a time. That is, a request sequences through any required precharge and activation phases and then a read or write phase, at which point it is considered completed and the next request initiated. Finally, the state of the four bank state machines is decoded by the issue logic that generates the SDRAM control signals.

There are several SDRAM parameters that the state machines must obey. These parameters vary slightly from vendor to vendor, but to simplify the state machines, the most common parameters were chosen and hard coded into the interval timers. Any SDRAM that is not compatible with the parameters listed in the following table is not supported.

Tr2rp and Tr2w are additional timing parameters that explicitly define the interval between successive read, write, and precharge commands. These parameters insure that successive commands do not cause conflicts on the data signals. While these parameters could be derived internally by a state machine sequencer, they are made explicit to simplify the state machines and use the same timer paradigm as the SDRAM parameters.

TABLE 7

| SDRAM Parameters | | |
| --- | --- | --- |
| Parameter | Value | Description |
| Trc | 7 | Activate bank A to Activate bank A |
| Tras | 5 | Activate bank A to Precharge bank A |
| Trp | 2 | Precharge bank A to Activate bank A |
| Trrd | 2 | Activate bank A to Activate bank B |
| Trcd | 2 | Activate bank A to Read bank A |
| Twp | 1 | Datain bank A to Precharge bank A |
| Tr2rp | 2 | Read bank A to Read or Precharge bank C |
| Tr2w | 6 | Read bank A to Write bank A |

With reference to Table 7, above, Banks A and B are in the same external bank while Bank C is in a different external bank.

Figure 11:
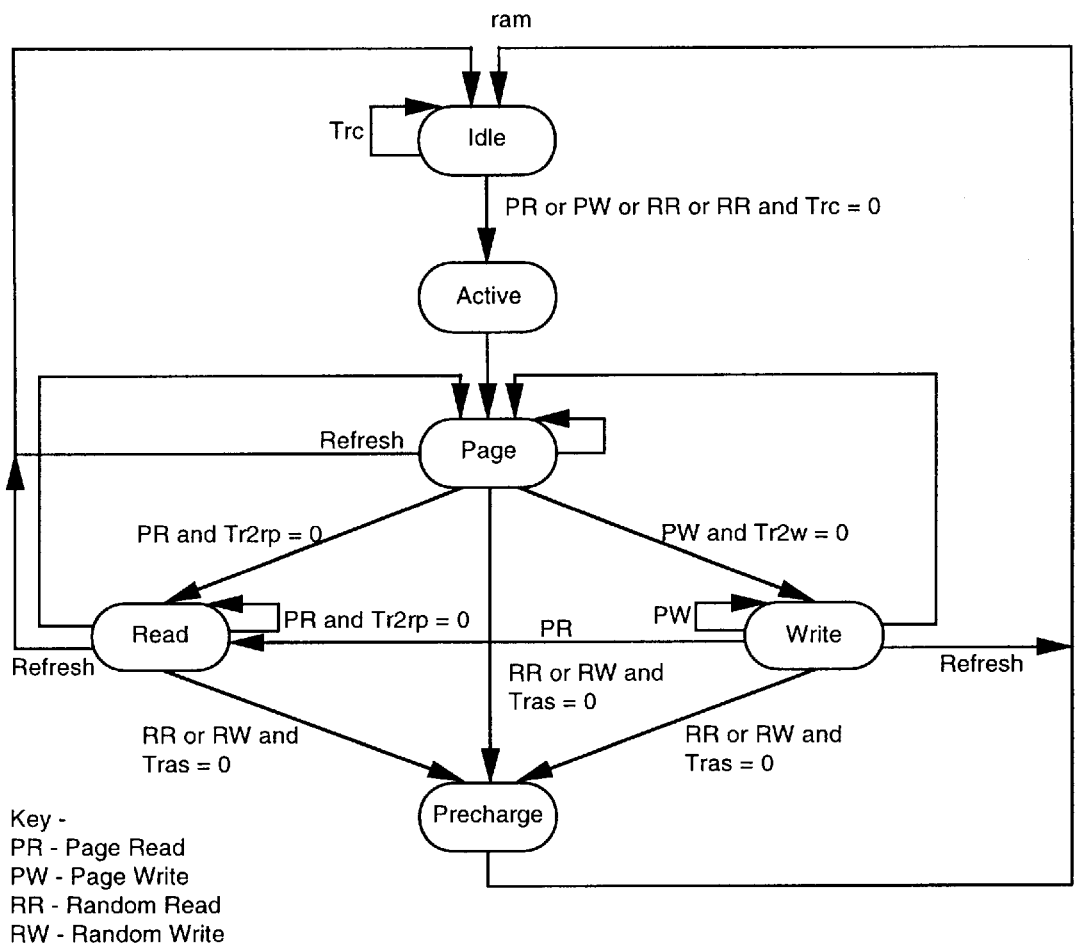
FIG. 11 shows a flow diagram for bank state machines according to the present invention.

With reference to FIG. 11, a flow diagram for the bank state machines is shown. As shown in FIG. 11, Trp, Trrd and Trcd are enforced by design. The Trc, Tras, Tr2rp and Tr2w parameters have a timer for each of the four bank state machines. The Tr2rp and Tr2w timers are common to all of the four bank state machines, because they are used to prevent conflicts on the shared data lines.

The initialization/refresh state machine has two functions, initialization and refresh. The initialization procedure is discussed first, followed by the refresh. After a reset, the initialization/refresh state machine sequences through the SDRAM initialization procedure, which is a precharge to all banks, followed by a mode set. The issue stage decodes the state of the initialization/refresh state machine into commands that are sent the SDRAM. After the mode set command programs the SDRAM mode set register to a CAS latency of 2, burst length of 1 and a sequential operation type.

The SDRAM requires that 4096 refresh cycles occur every 64 ms. In order to comply with this requirement, there is a refresh memory client with a timer. The timer sends out a signal every 27 microseconds which causes the refresh memory client to make a request to the arbiter. The arbiter treats refresh just like all the other memory clients. When the arbiter determines that the time for the refresh slot has come, the arbiter passes the refresh request to the decode stage. The decode stage invalidates all of the row registers and passes the request onto the state machine/issue stage. When a bank state machine sees that it is a refresh request, it goes to its idle state. The initialization/refresh state machine sequences through the refresh procedure which is a precharge to all banks followed by two refresh cycles. A refresh command puts the SDRAM in the automatic refresh mode. An address counter, internal to the device, increments the word and bank address during the refresh cycle. After a refresh cycle, the SDRAM is in the idle state, which means that all the pages are closed. This is why it is important that the bank state machines are forced to the idle state and the row registers are invalidated during a refresh request.

The initialization/refresh state machine is very similar in structure to the bank state machines and has timers to enforce SDRAM parameters. A Trc timer is used to enforce the Trc requirement between refresh cycles, and the outputs from the bank Tras timers are used to ensure that the "precharge all" command does not violate Tras for any of the active banks.

Data Pipe:

The main functions of the data pipe are to: (1) move data between a memory client and the unified system memory 202, (2) perform ECC operations and (3) merge new byte from a memory client with old data from memory during a read-modify-write operation. Each of these functions is described below.

Data Flow:

With reference to FIG. 4, the data pipe has one stage which is in lock-step with the last stage of the request pipe. When a write request reaches the decode stage, the request pipe asserts clientres.wrrdy. The clientres.wrrdy signal indicates to the memory client that the data on the Memdata2mem_in bus has been latched into the ECC stage of the data pipe. The data is held in the ECC stage and flows out to the unified system memory 202 until the request is retired in the request pipe.

Incoming read data is latched in the data pipe, flows through the ECC correction logic and then is latched again before going on the Memdata2client_out bus. The request pipe knows how many cycles the unified system memory 202 takes to return read responses data. When the read response data is on the Memdata2client_out bus, the request pipe asserts clientres.rdrdy.

The preferred embodiment of the present invention, a computer system architecture featuring dynamic memory allocation for graphics, is thus described. While the present invention has been described in particular embodiments, it should be appreciated that the present invention should not be construed as limited by such embodiments, but rather construed according to the below claims.

What is claimed is:

1. A computer system comprising:
   a memory controller;
   a graphics rendering engine coupled to said memory controller;
   a CPU coupled to said memory controller;
   an image processor coupled to said memory controller;
   a data compression/expansion device coupled to said memory controller;
   an input/output device coupled to said memory controller;
   a graphics back end device coupled to said memory controller;
   a system memory, coupled to said memory controller via a high bandwidth data bus, said system memory providing read/write access, through said memory controller, for memory clients including said CPU, said input/output device, said graphics back end device, said image processor, said data compression/expansion device, said rendering engine, and said memory controller, wherein said memory controller is the interface between said memory clients and said system memory; and
   translation hardware for mapping virtual addresses of pixel buffers to physical memory locations in said system memory wherein said pixel buffers are dynamically allocated as tiles of physically contiguous memory.

2. The computer system of claim 1 wherein said translation hardware is implemented in said rendering engine.

3. The computer system of claim 1 wherein said translation hardware is implemented in each of said rendering engine, said memory controller, said image processor, said data compression/expansion, said graphics back end IC, and said input/output IC.

4. The computer system of claim 1 wherein said system memory is implemented using synchronous DRAM.

5. The computer system of claim 1 wherein said system memory is implemented using synchronous DRAM (SDRAM) accessed via a 256-bit wide memory data bus cycled at 66 MHz.

6. The computer system of claim 1 wherein said tiles are comprised of 64 kilobytes of physically contiguous memory arranged as 128 rows of pixels.

7. The computer system of claim 1 wherein said tiles are comprised of 64 kilobytes of physically contiguous memory arranged as 128 rows of 128 pixels wherein each pixel is a 4 byte pixel.

8. The computer system of claim 1 wherein said rendering engine and said memory controller are implemented on a first IC.

9. The computer system of claim 1 wherein said rendering engine and said memory controller are implemented on a first IC and said image processor and said data compression/expansion device are implemented on a second IC.

10. The computer system of claim 1 wherein said dynamically allocated pixel buffers are comprised of $n^2$ tiles where n is an integer.

11. A computer system comprising:
    a graphics rendering engine and a memory controller implemented on a first IC;

a CPU coupled to said first IC;

an image processor coupled to said first IC;

a data compression/expansion device coupled to said first IC;

an input/output device coupled to said first IC;

a graphics back end device coupled to said first IC;

a system memory, coupled to said first IC via a high bandwidth data bus, said system memory providing read/write access, through said first IC, for memory clients including said CPU, said input/output device, said graphics back end device, said image processor, said data compression/expansion device, said rendering engine, and said memory controller, wherein said memory controller is the interface between said memory clients and said system memory; and translation hardware for mapping virtual addresses of pixel buffers to physical memory locations in said system memory wherein said pixel buffers are dynamically allocated as tiles of physically contiguous memory.

12. The computer system of claim 11 wherein said translation hardware is implemented in said rendering engine.

13. The computer system of claim 11 wherein said translation hardware is implemented in each of said rendering engine, said memory controller, said image processor, said data compression/expansion, said graphics back end IC, and said input/output IC.

14. The computer system of claim 11 wherein said system memory is implemented using synchronous DRAM.

15. The computer system of claim 11 wherein said system memory is implemented using synchronous DRAM (SDRAM) accessed via a 256-bit wide memory data bus cycled at 66 MHz.

16. The computer system of claim 11 wherein said tiles are comprised of 64 kilobytes of physically contiguous memory arranged as 128 rows of pixels.

17. The computer system of claim 11 wherein said tiles are comprised of 64 kilobytes of physically contiguous memory arranged as 128 rows of 128 pixels wherein each pixel is a 4 byte pixel.

18. The computer system of claim 11 wherein said image processor and said data compression/expansion are implemented on a second IC.

19. The computer system of claim 11 wherein said first IC is coupled to said system memory by a demultiplexing bus comprising a first bus, coupled to said first IC and having 144 lines cycled at 133 MHz, a second bus, coupled to said system memory and having 288 lines cycled at 66 MHz, and a demultiplexer for demultiplexing signals propagating between said first bus and said second bus.

20. The computer system of claim 11 wherein said dynamically allocated pixel buffers are comprised of $n^2$ tiles where n is an integer.

21. A computer system comprising:

a CPU;

an input/output device;

a graphics back end unit;

a first IC including an image processor and a data compression and expansion device integrated therein;

a second IC including a graphics rendering engine and a memory controller device integrated therein;

a system memory which allows read/write access for memory clients including said CPU, said input/output device, said graphics back end device, said image processor, said data compression/expansion device, said rendering engine, and said memory controller, wherein said memory controller is the interface between said memory clients and said system memory;

a high bandwidth data bus for transferring data between said system memory and said second IC; and translation hardware for mapping virtual addresses of pixel buffers to physical memory locations in said system memory wherein said pixel buffers are dynamically allocated as tiles of physically contiguous memory.

22. The computer system of claim 21 wherein said translation hardware is implemented in said rendering engine.

23. The computer system of claim 21 wherein said translation hardware is implemented in each of said rendering engine, said memory controller, said image processor, said data compression/expansion, said graphics back end IC, and said input/output IC.

24. The computer system of claim 21 wherein said system memory is implemented using synchronous DRAM.

25. The computer system of claim 21 wherein said system memory is implemented using synchronous DRAM (SDRAM) accessed via a 256-bit wide memory data bus cycled at 66 MHz.

26. The computer system of claim 21 wherein said tiles are comprised of 64 kilobytes of physically contiguous memory arranged as 128 rows of pixels.

27. The computer system of claim 21 wherein said tiles are comprised of 64 kilobytes of physically contiguous memory arranged as 128 rows of 128 pixels wherein each pixel is a 4 byte pixel.

28. The computer system of claim 21 wherein said second IC is coupled to said system memory by a demultiplexing bus comprising a first bus, coupled to said second IC and having 144 lines cycled at 133 MHz, a second bus, coupled to said system memory and having 288 lines cycled at 66 MHz, and a demultiplexer for demultiplexing signals propagating between said second bus and said system memory.

29. The computer system of claim 21 wherein said dynamically allocated pixel buffers are comprised of $n^2$ tiles where n is an integer.

* * * * *